US012726850B2

(12) United States Patent
Lei

(10) Patent No.: US 12,726,850 B2
(45) Date of Patent: Sep. 1, 2026

(54) COMMUNICATION METHOD AND APPARATUS FOR AUTOMATIC DRIVING, DEVICE, STORAGE MEDIUM AND PROGRAM PRODUCT

(71) Applicant: TENCENT TECHNOLOGY (SHENZHEN) COMPANY LIMITED, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 318 days.

(21) Appl. No.: 18/448,423

(22) Filed: Aug. 11, 2023

(65) Prior Publication Data

US 2023/0388849 A1 Nov. 30, 2023

Related U.S. Application Data

(63) Continuation of application No. PCT/CN2022/135818, filed on Dec. 1, 2022.

(30) Foreign Application Priority Data

Jan. 11, 2022 (CN) ......................... 202210028788.1

(51) Int. Cl.
*H04W 28/02* (2009.01)
*H04W 4/40* (2018.01)

(52) U.S. Cl.
CPC ......... *H04W 28/0268* (2013.01); *H04W 4/40* (2018.02)

(58) Field of Classification Search
CPC ..... H04W 28/0268; H04W 4/40; H04W 4/44; H04W 4/46; H04L 41/147; H04L 41/5003; H04L 43/08; H04L 67/12; H04L 67/61
See application file for complete search history.

(56) References Cited

U.S. PATENT DOCUMENTS

2004/0192341 A1 9/2004 Wang et al.
2018/0176325 A1* 6/2018 Liang ...................... H04L 65/80
(Continued)

FOREIGN PATENT DOCUMENTS

CN 110996302 A 4/2020
CN 112243590 A 1/2021
CN 112740636 A 4/2021

OTHER PUBLICATIONS

International Search Report for PCT/CN2022/135818 dated Jan. 20, 2023 (PCT/ISA/210).

(Continued)

*Primary Examiner* — Liem H. Nguyen
(74) *Attorney, Agent, or Firm* — Sughrue Mion, PLLC

(57) ABSTRACT

A communication method and apparatus applied to automatic driving of an intelligent connected vehicle, and relates to the technical field of automatic driving of intelligent connected vehicles. The communication method, performed by a computer device, includes: acquiring driving information of a vehicle, determining a network cell of a path which the vehicle needs to pass according to the driving information, determining a prediction mechanism adopted for predicting quality of service (QoS) of the network cell, and acquiring a QoS prediction result of the network cell according to the prediction mechanism.

11 Claims, 4 Drawing Sheets

Determine time at which the vehicle arrives at a first position region according to the driving information of the vehicle — 331

Determine the prediction mechanism adopted by the vehicle for predicting the QoS of the network cell corresponding to the first position region according to the time — 332

(56) References Cited

U.S. PATENT DOCUMENTS

| | | | | |
|---|---|---|---|---|
| 2019/0045399 | A1* | 2/2019 | Bongaarts | H04W 36/023 |
| 2019/0379592 | A1* | 12/2019 | Samadi | H04L 41/145 |
| 2020/0107212 | A1* | 4/2020 | Zielinski | H04W 4/46 |
| 2021/0092584 | A1* | 3/2021 | Zou | H04W 36/008375 |
| 2021/0112441 | A1* | 4/2021 | Sabella | H04W 40/18 |
| 2021/0114616 | A1* | 4/2021 | Altman | H04W 76/15 |
| 2021/0306887 | A1 | 9/2021 | Kim et al. | |
| 2021/0321233 | A1* | 10/2021 | Mach | H04W 24/10 |
| 2021/0410029 | A1* | 12/2021 | Farag | H04L 41/147 |
| 2022/0060942 | A1* | 2/2022 | Jeon | H04L 41/5025 |
| 2022/0330102 | A1* | 10/2022 | Berliner | H04W 16/28 |
| 2023/0074288 | A1* | 3/2023 | Filippou | H04L 47/127 |
| 2023/0362082 | A1* | 11/2023 | Svennebring | H04W 24/08 |

OTHER PUBLICATIONS

Written Opinion for PCT/CN2022/135818 dated Jan. 20, 2023 (PCT/ISA/237).

* cited by examiner

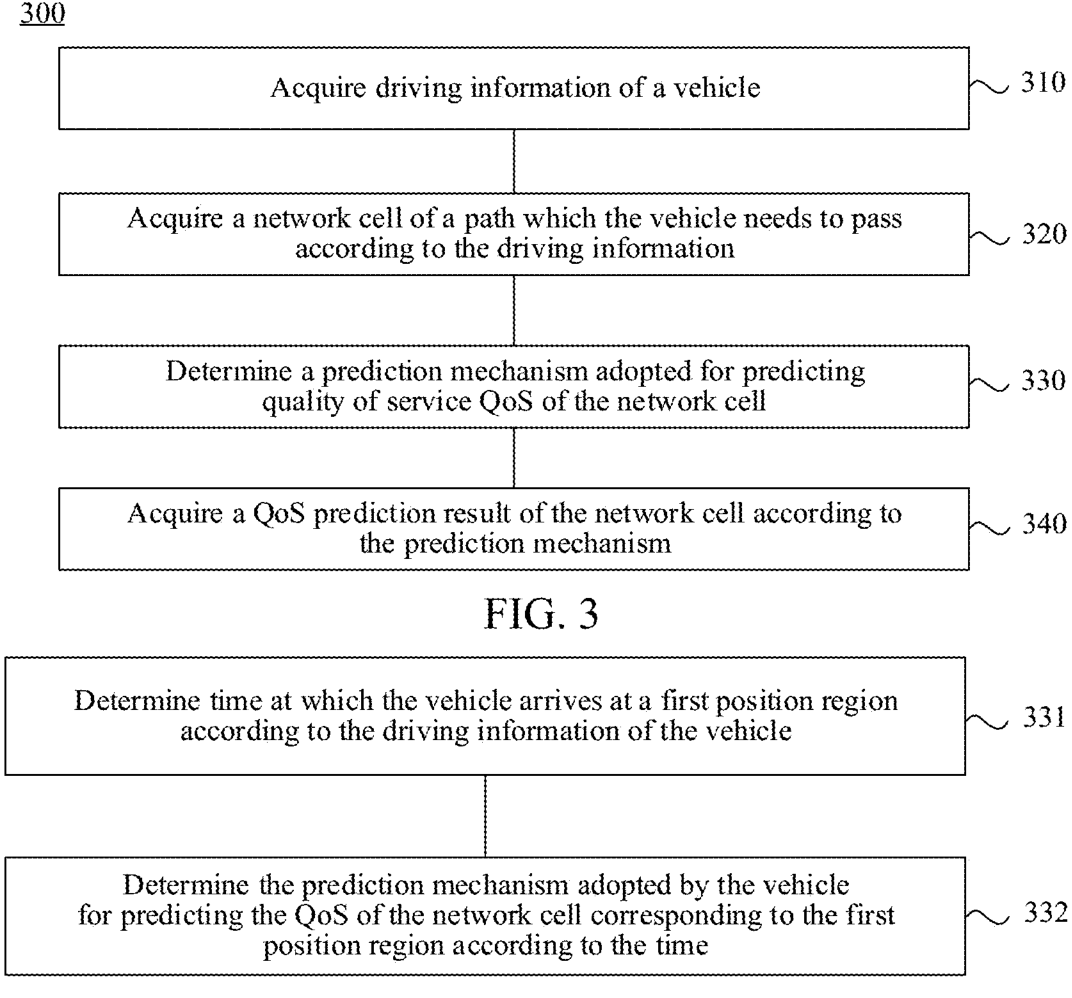
FIG. 3
FIG. 4
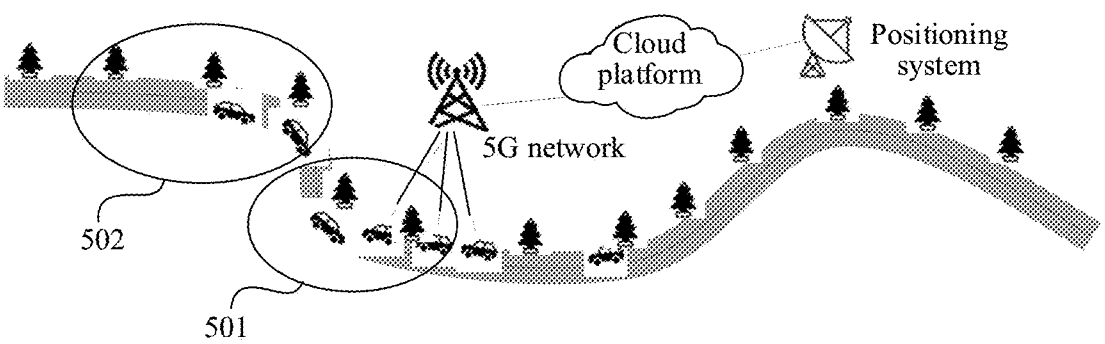
FIG. 5

COMMUNICATION METHOD AND APPARATUS FOR AUTOMATIC DRIVING, DEVICE, STORAGE MEDIUM AND PROGRAM PRODUCT

CROSS-REFERENCE TO RELATED APPLICATION(S)

This application is a continuation application of International Application No. PCT/CN2022/135818, filed on Dec. 1, 2022, which claims priority to Chinese Patent Application No. 202210028788.1, filed with the National Intellectual Property Administration, PRC, on Jan. 11, 2022, the disclosures of which are incorporated herein by reference in their entireties.

FIELD

The disclosure relates to the technical field of automatic driving of intelligent connected vehicles, and in particular, to a communication method and apparatus for automatic driving, a device, a storage medium and a program product.

BACKGROUND

An intelligent connected vehicle refers to a new generation of automobile which is an organic combination of the Internet of vehicles and an intelligent vehicle, and it not only carries advanced single-vehicle intelligent apparatuses such as a vehicle-mounted sensor, a controller and an executor, but also realizes intelligent information exchange and sharing between a vehicle and persons, vehicles, roads, backgrounds, etc. through a communication network (e.g., a 5G network).

The intelligent connected vehicle is capable of autonomous driving. Autonomous driving of a vehicle may also be called automatic driving which has certain automatic driving levels (L1-L5). An automatic driving function may rely on a communication network, for example, information assistance is performed through 5G networking, and even operations are taken over. At the same time, as automatic driving needs to rely on the communication network, the performance of the communication network needs to be monitored. If the communication network is not reliable, the automatic driving level shall be adjusted in advance according to road conditions and own capabilities of vehicles, for example, driving is performed in a single-vehicle intelligent mode, or driving is stopped and the vehicles are parked at safe positions.

In the related art, a prediction process of quality of service (QoS) is high in complexity and may consume a large amount of computing power resources. There is still no effective solution in the related art for solving the problems of high computing power and high complexity of QoS prediction in automatic driving of the intelligent connected vehicle.

SUMMARY

Embodiments of the disclosure provide a communication method and apparatus applied to automatic driving of an intelligent connected vehicle, a device, a storage medium and a program product, which can help to lower the complexity and/or computing power consumption of QoS prediction in automatic driving of the intelligent connected vehicle.

Some embodiments provide a communication method for automatic driving, performed by a computer device, including: acquiring driving information of a vehicle; determining a network cell of a path which the vehicle needs to pass according to the driving information; determining a prediction mechanism adopted for predicting (QoS) of the network cell; and acquiring a QoS prediction result of the network cell according to the prediction mechanism.

Some embodiments provide a communication apparatus applied to automatic driving of an intelligent connected vehicle, including: at least one memory configured to store program code; and at least one processor configured to read the program code and operate as instructed by the program code, the program code including: acquisition code configured to cause the at least one processor to acquire driving information of the vehicle; and processing code configured to cause the at least one processor to determine a network cell of a path which the vehicle needs to pass according to the driving information; wherein the processing code is further configured to cause the at least one processor to determine a prediction mechanism adopted for predicting quality of service (QoS) of the network cell; and the acquisition code is further configured to cause the at least one processor to acquire a QoS prediction result of the network cell according to the prediction mechanism.

Some embodiments provide an electronic device, including: a processor and a memory, the memory being configured to store a computer program, and the processor being configured to call and run the computer program stored in the memory to perform the methods provided by some embodiments.

Some embodiments provide a computer-readable storage medium, including a computer-executable instruction, the computer-executable instruction, when run by an electronic device, causing the electronic device to perform the method provided by some embodiments.

Some embodiments provide a computer program product, including a computer program or a computer-executable instruction, the computer program or the computer-executable instruction causing an electronic device to perform the method provided by some embodiments.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 3 is a schematic flowchart of a communication method applied to automatic driving of an intelligent connected vehicle according to some embodiments.

FIG. 4 is a schematic flowchart of another communication method applied to automatic driving of an intelligent connected vehicle according to some embodiments.

FIG. 5 is another schematic diagram of an application scenario according to some embodiments.

FIG. 6 is a schematic flowchart of another communication method applied to automatic driving of an intelligent connected vehicle according to some embodiments.

DETAILED DESCRIPTION

Figure 1:
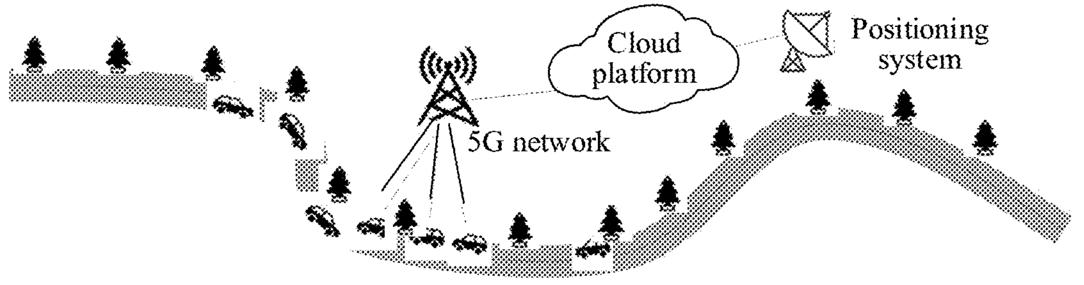
FIG. 1 is a schematic diagram of an application scenario according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In some embodiments, the prediction mechanism adopted when QoS measurement is performed on the network cell is adaptively adopted by determining the network cell of the path which the vehicle passes, by adopting different prediction mechanisms, the QoS in automatic driving can be predicted flexibly, and compared with adopting a uniform prediction mechanism for all network cells, the computing power requirement and/or complexity of QoS prediction in automatic driving are/is obviously lowered.

The terms "first", "second", and so on are used for distinguishing similar objects, and are not necessarily used for describing a specific order or sequence. It is to be understood that such used data is interchangeable where appropriate so that the some embodiments described here can be implemented in an order other than those illustrated or described here. Moreover, the terms "include", "have" and any other variants thereof mean to cover the non-exclusive inclusion, for example, a process, method, system, product, or server that includes a list of operations or units is not necessarily limited to those expressly listed operations or units, but may include other operations or units not expressly listed or inherent to such a process, method, product, or device.

Further, in the following descriptions, A and/or B refers to at least one of A and B.

\Artificial intelligence (AI) is a theory, a method, a technology, and an application system that use a digital computer or a machine controlled by the digital computer to simulate, extend, and expand human intelligence, perceive an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning.

With the research and progress of the AI technology, the AI technology has been studied and applied in multiple fields, such as common smart homes, intelligent wearable devices, virtual assistants, intelligent speakers, intelligent marketing, unmanned driving, automatic driving, drones, robots, intelligent healthcare, intelligent customer service, etc. It is believed that with the development of technology, the AI technology will be applied in more fields, and unleash increasingly important value.

Some embodiments relate to an automatic driving technology in the AI technology. The automatic driving technology makes a computer operate a motor vehicle automatically and safely without any active operation performed by a person through collaboration of AI, computer vision, radar, a monitoring apparatus and a global positioning system. The automatic driving technology usually includes technologies such as high-precision maps, environment perception, behavior decision, path planning and motion control. The automatic driving technology has wide application prospects. In some embodiments, the technical solution provided by some embodiments relates to a communication method applied to automatic driving of an intelligent connected vehicle, which may be used for QoS prediction of automatic driving.

Some embodiments relate to a cloud computing technology in the AI technology. The communication method applied to automatic driving according to some embodiments may perform QoS prediction by using a cloud computing manner, and the method may be executed by network elements deployed on a cloud platform.

Cloud computing is a computing mode, which distributes computing tasks on a resource pool composed of a large number of computers to make various application systems able to acquire computing power, storage space and information service according to needs. A network providing resources is called "cloud". The resources in the "cloud" may be infinitely extended from the perspective of users, and may be acquired at any time, used as needed, extended at any time and charged according to use.

As a basic capability provider of cloud computing, cloud will establish a cloud computing resource pool (called a cloud platform for short, and generally called an infrastructure as a service (IaaS) platform), and various types of virtual resources are deployed in the resource pool for external clients to select and use. The cloud computing resource pool mainly includes: a computing device (a virtual machine, containing an operating system), a storage device and a network device.

According to the division of logic functions, a platform as a service (PaaS) layer may be deployed on an IaaS layer, a software as a service (SaaS) layer is then deployed on the PaaS layer, or SaaS may also be directly deployed on IaaS. PaaS is a platform where software runs, such as a database and a web container. SaaS is a variety of business software, such as a web portal website and a short message group sending device. In general, SaaS and PaaS are upper layers relative to IaaS.

FIG. 1 is a schematic diagram of an application scenario according to some embodiments. As shown in FIG. 1, the intelligent connected vehicle performs automatic driving relying on 5G networking. The cloud platform may create service instances for the intelligent connected vehicle, and the service instances may acquire the position and state of the intelligent connected vehicle as well as surrounding network states of the intelligent connected vehicle. In some embodiments, the cloud platform may interact with a 5G network (e.g., a core network) as an application function (AF) to perform QoS monitoring on the 5G network around the intelligent connected vehicle.

In some embodiments, the cloud platform may further acquire position information of the intelligent connected vehicle from a positioning system. In some embodiments, the positioning system may be a global positioning system (GPS), which is not limited.

In FIG. 1, the description is made by taking an example that the network is the 5G network, and the 5G network may be further replaced with a global system of mobile communication (GSM), wideband code division multiple access (WCDMA), a 4G network, a next generation network, Bluetooth, Wi-Fi, a voice network and other wireless networks, which is not limited.

Figure 2:
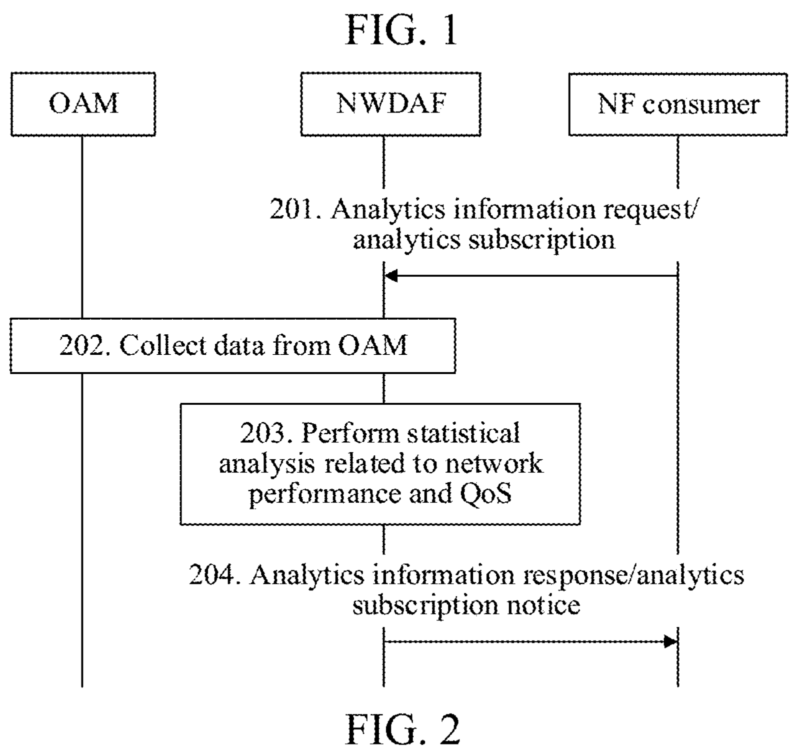
FIG. 2 is a schematic diagram of a flow of QoS prediction according to some embodiments.

The 3rd generation partnership project (3GPP) introduces a QoS prediction mechanism in the 5G network. FIG. 2 shows a schematic diagram of a flow of QoS prediction. In the QoS prediction mechanism, a network data analytics function (NWDAF) may perform statistics of historical data and prediction of a future trend on QoS characteristics of the 5G network. As shown in FIG. 2, the flow of QoS prediction may include operations 201 to 204.

In operation 201, a network function (NF) consumer sends an analytics information request/analytics subscription (Nnwdaf_AnalyticsInfo_Request/Nnwdaf_Analytics-Subscription_Subscribe) to the NWDAF.

The analytics information request/analytics subscription may include an analytics identifier (Analytics ID), and the analytics identifier may be used for indicating QoS sustainability.

After receiving the analytics information request/analytics subscription, the NWDAF may provide network data collection and analytics functions which are based on technologies such as big data and artificial intelligence, such as following operations 202 and 203.

In operation 202, the NWDAF collects data from operation administration and maintenance (OAM).

In some embodiments, the data here may refer to relevant data generated by work such as operations, administration and maintenance on the network, for example, relevant data of analytics, prediction, planning and configuration work performed on daily networks and business, and/or relevant data of daily operation activities performed on testing and failure management of the networks and business thereof, which are not limited.

In operation 203, the NWDAF performs statistical analysis related to network performance and QoS.

In some embodiments, the NWDAF may perform the statistical analysis related to network performance and QoS according to the data collected in operation 202, so as to monitor parameters of different network elements and perform prediction. In some embodiments, corresponding to the above analytics identifier of QoS sustainability, the NWDAF may perform statistical analysis of historical data and prediction of the future trend on the QoS characteristics of the 5G network.

In operation 204, the NWDAF sends an analytics information response/analytics subscription notice (Nnwdaf_AnalyticsInfo_Response/Nnwdaf_AnalyticsSubscription_Notify) to the NF consumer.

The analytics information response/analytics subscription notice may include a QoS prediction result of the 5G network.

For the application scenario in FIG. 1, namely automatic driving based on 5G networking (may also be called 5G networking type automatic driving), the cloud platform will predict network states in the traveling process of a large number of intelligent connected vehicles. If the QoS prediction mechanism shown in FIG. 2 is adopted to perform statistical analysis of historical data and prediction of a future trend on the QoS characteristics of the 5G network of each intelligent connected vehicle, as this prediction algorithm is high in complexity, a large amount of computing power resources will be consumed. Especially in a case that the intelligent connected vehicle needs to be operated in real time relying on networking, a high requirement is also imposed on convergence time of the QoS prediction algorithm.

Sone embodiments provide a communication method applied to automatic driving of an intelligent connected vehicle, which can help to lower the complexity of QoS prediction and lower computing power consumption of QoS prediction in automatic driving of the intelligent connected vehicle.

In some embodiments, a network cell of a path which a vehicle needs to pass is determined according to driving information of the vehicle, a prediction mechanism adopted for predicting quality of service QoS of the network cell is further determined, and then a QoS prediction result of the network cell is acquired according to information of the cell and the prediction mechanism.

Therefore, in some embodiments, by determining the prediction mechanism adopted when QoS measurement is performed on the network cell of the path which the vehicle passes, the QoS in automatic driving can be predicted flexibly, which helps to lower the computing power requirement and/or complexity of QoS prediction in automatic driving.

In some embodiments, when the computing requirement and/or complexity of QoS prediction in automatic driving are/is lowered, the convergence time of the QoS prediction algorithm can also be lowered correspondingly, and thus it can be conducive to meeting the requirement of performing real-time operations on the intelligent connected vehicle relying on networking.

The following introduces the communication method applied to automatic driving of the intelligent connected vehicle involved in some embodiments with reference to the accompanying drawings.

FIG. 3 is a schematic flowchart of a communication method 300 applied to automatic driving of an intelligent connected vehicle according to some embodiments. The method 300 may be executed by any electronic device with a data processing capability. In some embodiments, the electronic device may be implemented as a network element entity or a functional entity, or a virtual machine or server having a network element function. In some embodiments, the method 300 may be used for QoS prediction of 5G networking type automatic driving. The method 300 may be applied to an application function AF network element, for example, being executed by the AF network element, and the AF network element may be deployed on a cloud platform.

As shown in FIG. 3, the method 300 includes operations 310 to 340.

In operation 310, driving information of a vehicle is acquired.

In some embodiments, the vehicle may be the intelligent connected vehicle, or other intelligent automobiles which can perform intelligent driving/automatic driving relying on networks, which is not limited.

In some embodiments, the driving information of the vehicle includes at least one of vehicle speed information, driving intention information and driving trajectory prediction information of the vehicle. The driving intention information may include at least one of a destination and a passing-by place, and may also include a current or possible driving mode of the vehicle, such as following a vehicle ahead, overtaking a vehicle, changing lanes, turning and stopping.

In some embodiments, the vehicle may report the vehicle speed information to an AF. In some embodiments, the vehicle may sense the surroundings in real time in the traveling process of the vehicle and collect various data in the traveling process by using various mounted sensors (e.g., millimeter wave radar, laser radar, monocular or binocular cameras, and satellite navigation), and may perform systematic operation and analysis on the data in combination with navigation map data to obtain and report the real-time vehicle speed information to the AF. Correspondingly, the AF may acquire the vehicle speed information of the vehicle according to the information reported by the vehicle.

In some embodiments, the AF may acquire position information of the vehicle at different moments and calculate the speed information of the vehicle according to the position information at different moments. In some embodiments, the AF may acquire the position information of the vehicle at different moments through data reported by the GPS or a roadside sensor.

In some embodiments, the AF may acquire first information inputted by a user from a user application, and the first information includes the driving intention information and/or the driving trajectory information of the user. In some embodiments, the user application may be installed in a user terminal and used for interactions between the user and the cloud platform, for example, the user may input a driving intention of the user through the user application, such as an expected destination of the user, a required driving speed and other information; or the user may input a driving trajectory of the user through the user application, such as an expected driving path of the user and other information.

In some embodiments, the user application may further show relevant information of the vehicle to the user, such as the speed information of the vehicle, a path planned for the user by the cloud platform and other information, which is not limited herein.

In operation 320, a network cell of a path which the vehicle needs to pass is acquired according to the driving information.

In some embodiments, the AF may determine a driving path of the vehicle and determine a network cell which can cover the driving path according to the driving information of the vehicle, such as the vehicle speed information, the driving intention information and the driving trajectory prediction information. In some embodiments, signal strength of the network cell on the driving path is the maximum, or the signal strength on the driving path is greater than a preset threshold, which is not limited thereto.

The embodiments of the disclosure are not limited as to the number of network cells on the path, the number may be one, two or more.

In some embodiments, the network cell may be a network cell of a wireless network such as GSM, WCDMA, the 4G network, the 5G network, a future next-generation network, Wi-Fi and a voice network, which is not limited.

Taking a 5G communication system as an example, division granularities of the network cell are diversified, and the network cell may be any one of a cell, a microcell and a picrocell. Of course, the division granularity of the network cell may also be a cell group, such as a master cell group (MCG) and a secondary cell group (SCG).

The division granularity of the network cell may be fixed or set in a targeted manner according to a historical activity range of a vehicle, for example, the larger the historical activity range of the vehicle, the greater the division granularity of the network cell, so that the division granularity can adapt to activity ranges of different vehicles, thereby improving the flexibility and accuracy of a prediction mechanism hereinafter.

In some embodiments, after the network cell of the path which the vehicle needs to pass is determined, cell information of the network cell may be acquired. In some embodiments, the cell information of the network cell may include at least one of a section which the vehicle passes in the network cell, or a cell identity, an area identity (AI) and a registering area identity (RAI) of the network cell. Here, the section which the vehicle passes in the network cell may be determined according to a coverage range of the network cell and the path which the vehicle needs to pass, for example, a section, within the coverage range of the network cell, in the path which the vehicle needs to pass may be used as the section which the vehicle passes in the network cell.

The cell identity is used for identifying the cell, and is a unique identity of the cell in a public land mobile network (PLMN), for example, the cell identity may be a physical cell identity (PCI), an NR cell global identifier (NCGI), and the like. The AI is an identity of an area in the PLMN, can be used for position management of terminal devices (e.g., the intelligent connected vehicle), and is unique in the PLMN, for example, the AI may include an area code (AC) identity. The RAI is an identity of a registering area in the PLMN, can also be used for position management of terminal devices (e.g., the intelligent connected vehicle), and is unique in the PLMN, for example, the RAI may include a registration area code (RAC) identity.

In operation 330, a prediction mechanism adopted for predicting quality of service QoS of the network cell is determined. Prediction algorithms of different prediction mechanisms are different in complexity and/or computing power requirement.

In some embodiments, referring to FIG. 4, the prediction mechanism adopted for predicting the QoS of the network cell may be determined through following operations 331 and 332.

In operation 331, time at which the vehicle arrives at a first position region is determined according to the driving information of the vehicle.

In some embodiments, the first position region may include the section which the vehicle passes in the network cell. Referring to FIG. 5, a coverage range of a network cell 1 is a region 501, so a section which the vehicle needs to pass in the region 501 may be used as an example of the first position region; and a coverage range of a network cell 2 is a region 502, so a section which the vehicle needs to pass in the region 502 may be used as another example of the first position region.

In some embodiments, the first position region may be a position and/or region on the path which the vehicle needs to pass. As a specific example, the first position region may be a position or region, within a range of a certain distance (e.g., 1 m, 10 m, 30 m, 50 m, etc.) to a current position of the vehicle, on a path which the vehicle is to pass.

In some embodiments, the first position region may be set in advance, for example, the first position region may be set as the section which the vehicle passes in the network cell, or a position and/or region on the path which the vehicle needs to pass, which is not limited thereto.

Here, the time at which the vehicle arrives at the first position region is short, for example, it is less than a certain particular threshold value, denoting that the vehicle is about to arrive at the first position region; and the time at which the vehicle arrives at the first position region is long, for example, it is greater than a certain particular threshold value, denoting that the vehicle further needs to take a long time to arrive at the first position region.

As an example, the above particular threshold value may be 80% (of course, it may also be other proportions greater than 50%) of time consumed by a journey of the vehicle arriving at the first position region, assuming that the journey consumes 1 hour, then within first 48 minutes of the journey, it is recognized that the vehicle further needs to take a long time to arrive at the first position region, and within last 12 minutes of the journey, it is recognized that the vehicle is about to arrive at the first position region.

As an example, the above particular threshold value may be a numeric value set by a user according to own requirements, for example, In operation 332, the prediction mechanism adopted for predicting the QoS of the network cell corresponding to the first position region is determined according to the time.

In some embodiments, when the time at which the vehicle arrives at the first position region denotes that the vehicle is about to arrive at the first position region, QoS prediction data of the network cell corresponding to the first position region have great value for safe driving of the vehicle, and at the moment, the prediction algorithm of the prediction mechanism adopted for predicting the QoS of the network cell may have a high complexity and/or computing power requirement to facilitate improvement of the precision of QoS prediction in automatic driving.

When the time at which the vehicle arrives at the first position region denotes that the vehicle further needs to take a long time to arrive at the first position region, due to a time difference, QoS prediction data of the network cell corresponding to the first position region have little significance to driving of the vehicle, and at the moment, the prediction algorithm of the prediction mechanism adopted for predicting the QoS of the network cell may have a low complexity and/or computing power requirement to facilitate lowering of the computing power requirement and/or complexity of QoS prediction in automatic driving.

The number of first position regions are not limited herein, for example, the number may be 1, 2 or more. When the number of the first position regions is at least two, the prediction mechanisms adopted for predicting the QoS of the network cells in cases where the vehicle is in these different position regions may be determined respectively. Moreover, as the time at which the vehicle arrives at these different position regions is different relative to the current moment, the QoS prediction mechanisms with different computing power requirements and/or complexities may be adopted.

In some embodiments, in a case that the time at which the vehicle arrives at the first position region is greater than a first threshold value, it is determined that the prediction mechanism adopted for predicting the QoS of the network cell is a first prediction mechanism, and the first prediction mechanism includes statistics of historical data on QoS characteristics of the network cell.

In some embodiments, when the vehicle further needs a long time to arrive at the first position region, as the QoS prediction data of the network cell corresponding to the first position region have little significance to driving of the vehicle, the first prediction mechanism may be adopted to predict the QoS of the network cell, that is, statistics of historical data is performed on the QoS characteristics of the network cell, while prediction of a future trend is not performed on the QoS characteristics of the network cell. In some embodiments, continuing to refer to FIG. 5, as for the region 502, the first prediction mechanism may be adopted to perform QoS measurement on the network cell, that is, only statistics of historical data of QoS characteristic parameters is performed.

Since an algorithm adopted for predicting the future trend of the QoS characteristics of the network cell is relatively more complex and consumes more computing power, by adopting the first prediction mechanism to perform QoS prediction on the position at which a long time needs to be taken to arrive, the computing power requirement and/or complexity of QoS prediction in automatic driving can be lowered on the premise of not affecting the effectiveness and reliability of QoS prediction, thereby saving computing resources.

In some embodiments, in a case that the time at which the vehicle arrives at the first position region is less than or equal to a second threshold value, it is determined that the prediction mechanism adopted for predicting the QoS of the network cell is a second prediction mechanism, and the second prediction mechanism includes statistics of the historical data on the QoS characteristics of the network cell and prediction of the future trend.

In some embodiments, when the vehicle is about to arrive at the first position region, as the QoS prediction data of the network cell corresponding to the first position region have great value for safe driving of the vehicle, the second prediction mechanism may be adopted to predict the QoS of the network cell, that is, statistics of the historical data and prediction of the future trend are performed on the QoS characteristics of the network cell. In some embodiments, continuing to refer to FIG. 5, as for the region 501, the second prediction mechanism may be adopted to perform QoS measurement on the network cell, that is, statistics of the historical data and prediction of the future trend of the QoS characteristic parameters are performed.

Therefore, in some embodiments, the second prediction mechanism is adopted to perform QoS prediction on the position at which the vehicle is about to arrive, which can facilitate improvement of the precision of QoS prediction in automatic driving, and then helps to improve the effectiveness and reliability of QoS prediction.

The first threshold value or the second threshold value may be configured in advance. In some embodiments, the first threshold value and the second threshold value may be the same, such as 48 minutes. In some other embodiments, the second threshold value may also be a value less than the first threshold value, such as 12 minutes, which is not limited herein.

In operation 340, a QoS prediction result of the network cell is acquired according to the prediction mechanism.

In some embodiments, the process of predicting the QoS of the network cell may be based on a current QoS prediction framework, such as the QoS prediction flow shown in FIG. 2. Different from the QoS prediction flow shown in FIG. 2, in operation 340, the prediction mechanism may be different for different regions on a path on which the vehicle needs to travel, and the prediction algorithms of the different prediction mechanisms are different in complexity and/or computing power requirement.

In some embodiments, referring to FIG. 6, the QoS prediction result of the network cell may be acquired through following operations 341 and 342.

In operation 341, a QoS analytics subscribing request is transmitted to a network data analytics function NWDAF according to the above prediction mechanism.

Here, the prediction mechanism is, for example, the above first prediction mechanism or the second prediction mechanism. In some embodiments, the QoS analytics subscribing request may include indication information used for indicating the cell information and the prediction mechanism.

In operation 342, a QoS analytics subscribing notice transmitted by the NWDAF is acquired, the QoS analytics subscribing notice including the QoS prediction result.

In some embodiments, when the prediction mechanism in operation 341 is the first prediction mechanism, the QoS prediction result only includes a QoS analytics result of a statistics type. When the prediction mechanism in operation 341 is the second prediction mechanism, the QoS prediction result may include QoS analytics results of the statistics type and a prediction type. Here, the QoS analytics result of the statistics type may include data obtained by performing statistics of the historical data on the QoS characteristics of the network cell, and the QoS analytics result of the prediction type may include data obtained by performing prediction of the future trend on the QoS characteristics of the network cell.

In some embodiments, the QoS prediction result of the network cell includes at least one of a bandwidth, delay, reliability or jitter of the network cell, which is not limited herein.

In some embodiments, when the QoS prediction result denotes that a communication network is not reliable, an automatic driving level shall be adjusted according to road conditions and own capabilities of vehicles, for example, driving is performed in a single-vehicle intelligent mode, or driving is stopped and the vehicles are parked at safe positions.

Therefore, some embodiments, by determining the prediction mechanism adopted when QoS measurement is performed on the network cell of the path which the vehicle passes, the QoS in automatic driving can be predicted flexibly, which helps to lower the computing power requirement and/or complexity of QoS prediction in automatic driving.

In some embodiments, when the computing requirement and/or complexity of QoS prediction in automatic driving are/is lowered, the convergence time of the QoS prediction algorithm can also be lowered correspondingly, and thus it can be conducive to meeting the requirement of performing real-time operations on the intelligent connected vehicle relying on networking.

Figure 7:
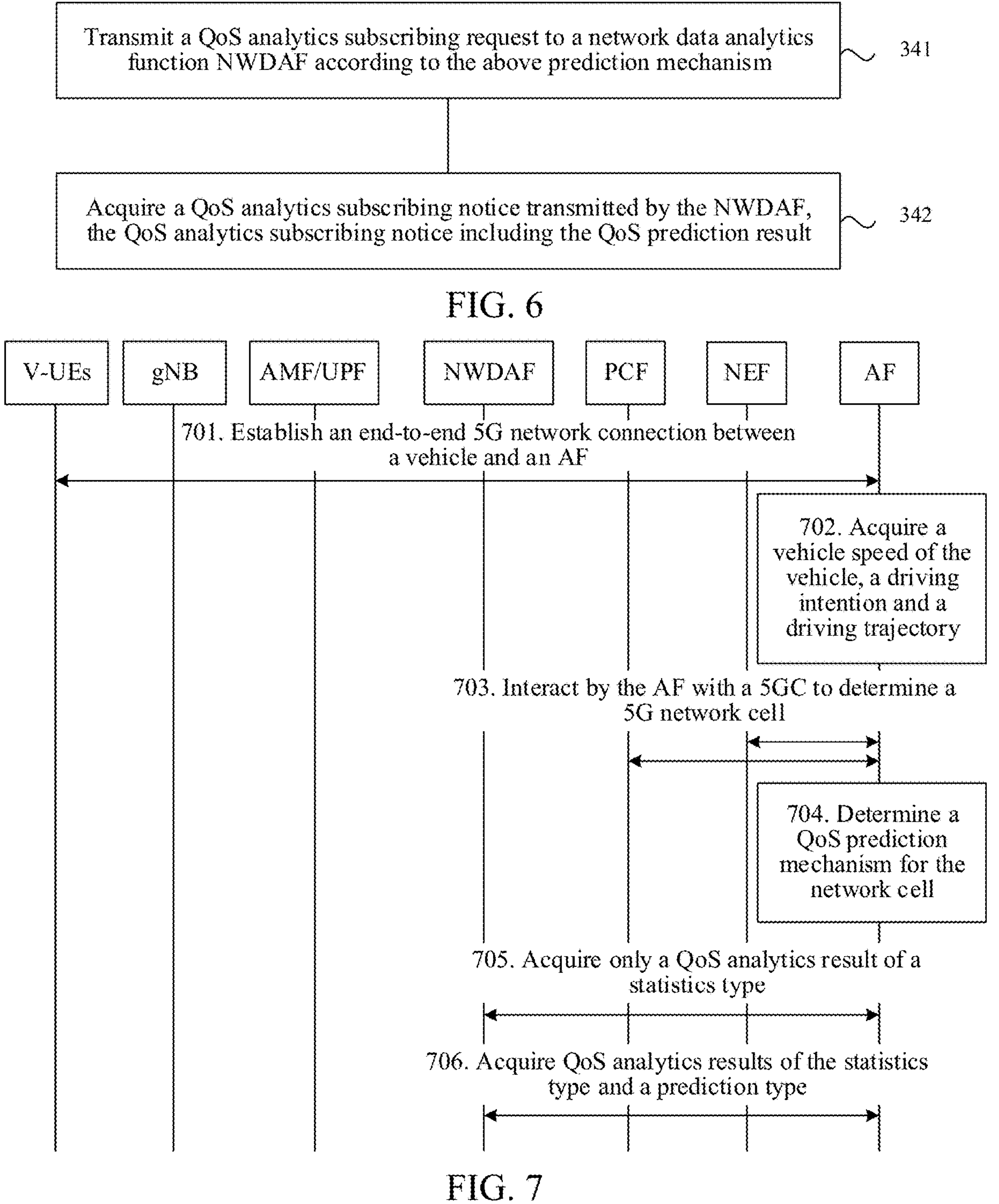
FIG. 7 is an interaction flowchart of a communication method applied to automatic driving of an intelligent connected vehicle according to some embodiments.

FIG. 7 is an interaction flowchart of a communication method applied to automatic driving of an intelligent connected vehicle provided by some embodiments. The method may be executed jointly by a user device (e.g., vehicular users (V-UEs), an access network device (e.g., gNB) and a 5G core network (5GC)) and an AF. In some embodiments, the 5GC may include network elements or functions such as an access and mobility management function (AMF)/user plane function (UPF), an NWDAF, a policy control function (PCF), and a network exposure function (NEF), and the AF may be deployed on a cloud platform.

It is to be understood that, FIG. 7 shows operations or operations of the communication method applied to automatic driving of the intelligent connected vehicle, but these steps or operations are merely examples, and some embodiments may further execute other operations or transformations of various operations in FIG. 7. In addition, the operations in FIG. 7 may be executed in an order different from an order presented in FIG. 7, and it is possible that not all the operations in FIG. 7 have to be executed. As shown in FIG. 7, the communication method applied to automatic driving of the intelligent connected vehicle includes operations 701 to 706.

In operation 701, an end-to-end 5G network connection is established between the V-UEs and the AF. In this way, the V-UEs and the AF may communicate wirelessly through the 5G network connection.

In some embodiments, the V-UEs are, for example, the intelligent connected vehicle above, which is not limited.

In operation 702, the AF acquires a vehicle speed of the vehicle, a driving intention and a driving trajectory.

In some embodiments, the AF may acquire vehicle speed information of the vehicle reported by the V-UEs, or calculate the vehicle speed information of the vehicle according to a position of the vehicle. In some embodiments, the AF may acquire driving intention information and driving trajectory information inputted by a user on a user application through interactions with the user application.

In operation 703, the AF interacts with the 5GC to determine a 5G network cell.

In some embodiments, the AF may determine the 5G network cell of a path which the vehicle is to pass according to the vehicle speed information, the driving intention information and the driving trajectory information of the vehicle, and further interact with the 5GC to acquire relevant information of the 5G network cell, such as at least one of a section which the vehicle passes in the network cell, or a cell identity, a TAI and an RAI of the network cell.

In operation 704, the AF determines a QoS prediction mechanism for the network cell.

In some embodiments, the AF may determine the QoS prediction mechanism adopted for performing QoS measurement on the network cell according to time at which the vehicle arrives at a first position region.

In some embodiments, in a case that the time is greater than a first threshold value, it is determined that the QoS prediction mechanism is a first prediction mechanism, and the first prediction mechanism includes statistics of historical data on QoS characteristics of the network cell. In a case that the time is less than or equal to a second threshold value, it is determined that the QoS prediction mechanism is a second prediction mechanism, and the second prediction mechanism includes statistics of the historical data and prediction of a future trend on the QoS characteristics of the network cell.

In operation 705, only a QoS analytics result of a statistics type is acquired.

In some embodiments, when the QoS prediction mechanism is the first prediction mechanism, only the QoS analytics result of the statistics type is acquired.

Here, by adopting the first prediction mechanism to perform QoS prediction on a position at which a long time needs to be taken to arrive, a computing power requirement and/or complexity of QoS prediction in automatic driving can be properly lowered on the premise of not affecting the effectiveness and reliability of QoS prediction.

In operation 706, QoS analytics results of the statistics type and a prediction type are acquired.

In some embodiments, when the QoS prediction mechanism is the second prediction mechanism, the QoS analytics results of the statistics type+the prediction type are acquired.

Here, the second prediction mechanism is adopted to perform QoS prediction on a position at which the vehicle is about to arrive, which can facilitate improvement of the precision of QoS prediction in automatic driving, and helps to improve the effectiveness and reliability of QoS prediction.

Therefore, in some embodiments, by determining the prediction mechanism adopted when QoS measurement is performed on the network cell of the path which the vehicle passes, the QoS in automatic driving can be predicted flexibly, which helps to lower the computing power requirement and/or complexity of QoS prediction in automatic driving.

In some embodiments, when the computing requirement and/or complexity of QoS prediction in automatic driving are/is lowered, the convergence time of the QoS prediction algorithm can also be lowered correspondingly, and thus it can be conducive to meeting the requirement of performing real-time operations on the intelligent connected vehicle relying on networking.

Some embodiments of the disclosure are described in detail above with reference to the accompanying drawings. However, the disclosure is not limited to the specific details in the foregoing implementations, a plurality of simple deformations may be made to the technical solution of the disclosure within a range of the technical concept of the disclosure, and these simple deformations fall within the protection scope of the disclosure. For example, the specific technical features described in the above can be combined in any suitable way without contradiction. In order to avoid unnecessary repetitions, various possible combination methods will not be described separately herein. For another example, various embodiments can also be combined arbitrarily. As long as they do not violate the idea of the disclosure, they shall also be regarded as the contents disclosed in the disclosure.

It is further to be understood that an order of sequence numbers of the foregoing processes does not indicate an execution sequence, and execution sequences of the processes shall be determined according to functions and internal logics thereof and shall not impose any limitation on an implementation process of some embodiments. It is to be understood that these sequence numbers are interchangeable where appropriate and can be implemented in an order other than those illustrated or described herein.

Some embodiments are described in detail below with reference to FIG. 8 to FIG. 9.

Figure 8:
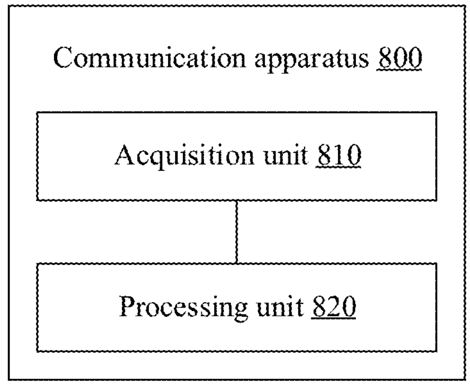
FIG. 8 is a schematic diagram of a communication apparatus applied to automatic driving of an intelligent connected vehicle according to some embodiments.

FIG. 8 is a schematic block diagram of a communication apparatus 800 applied to automatic driving of an intelligent connected vehicle provided by some embodiments. In some embodiments, the communication apparatus 800 is, for example, an AF. As shown in FIG. 8, the apparatus 800 may include an acquisition unit 810 and a processing unit 820.

The acquisition unit 810 is configured to acquire driving information of the vehicle; the processing unit 820 is configured to determine a network cell of a path which the vehicle needs to pass according to the driving information; the processing unit 820 is further configured to determine a prediction mechanism adopted for predicting quality of service QoS of the network cell; and the acquisition unit 810 is further configured to acquire a QoS prediction result of the network cell according to the prediction mechanism.

In some embodiments, the processing unit 820 is configured to: determine time at which the vehicle arrives at a first position region according to the driving information; and determine the prediction mechanism adopted for predicting the QoS of the network cell corresponding to the first position region according to the time.

In some embodiments, the processing unit 820 is configured to: determine, in a case that the time is greater than a first threshold value, that the prediction mechanism is a first prediction mechanism, the first prediction mechanism including statistics of historical data on QoS characteristics of the network cell.

In some embodiments, the processing unit 820 is configured to: determine, in a case that the time is less than or equal to a second threshold value, that the prediction mechanism is a second prediction mechanism, the second prediction mechanism including statistics of the historical data and prediction of a future trend on the QoS characteristics of the network cell.

In some embodiments, the QoS prediction result of the network cell includes at least one of a bandwidth, delay, reliability or jitter of the network cell.

In some embodiments, the acquisition unit 810 is configured to: transmit a QoS analytics subscribing request to a network data analytics function NWDAF according to the prediction mechanism; and acquire a QoS analytics subscribing notice transmitted by the NWDAF, the QoS analytics subscribing notice including the QoS prediction result.

In some embodiments, the driving information includes at least one of vehicle speed information, driving intention information or driving trajectory information.

In some embodiments, the acquisition unit 810 is configured to: acquire first information inputted by a user from a user application as the driving information, the first information including the driving intention information and/or the driving trajectory information.

It is to be understood that the apparatus embodiment may correspond to the method embodiment, and similar descriptions may refer to the method embodiment. Details are not described herein to avoid repetitions. In some embodiments, the apparatus 800 shown in FIG. 8 may execute the above method embodiment, and foregoing and other operations and/or functions of various modules in the apparatus 800 aim to implement the corresponding flows in the above methods respectively, which are not repeated herein for conciseness.

The apparatus 800 in some embodiments is described above from the perspective of functional modules with reference to the accompanying drawings. It is to be understood that the functional modules may be implemented in a hardware form, may also be implemented through instructions in a software form, and may also be implemented through combinations of hardware and software modules. In some embodiments, the operations of the method in some embodiments may be completed through an integrated logic circuit of hardware in a processor and/or instructions in a software form, and the operations of the methods disclosed with reference to some embodiments may be directly performed by using a hardware decoding processor, or may be performed by using a combination of hardware and software modules in the decoding processor. In some embodiments, the software module may be located in a mature storage medium in the art, such as a random access memory, a flash memory, a read-only memory, a programmable read-only memory, an electrically erasable programmable memory, and a register. The storage medium is located in a memory. The processor reads information in the memory and completes the operations in the method embodiments in combination with hardware thereof.

A person skilled in the art would understand that these "units" could be implemented by hardware logic, a processor or processors executing computer software code, or a combination of both. The "units" may also be implemented in software stored in a memory of a computer or a non-transitory computer-readable medium, where the instructions of each unit are executable by a processor to thereby cause the processor to perform the respective operations of the corresponding unit.

Figure 9:
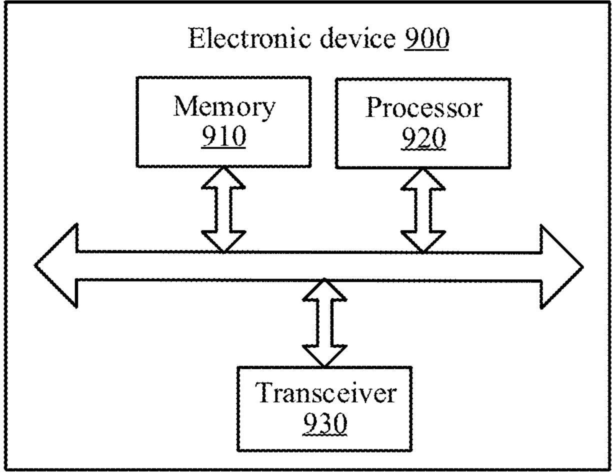
FIG. 9 is a schematic block diagram of an electronic device according to some embodiments.

FIG. 9 is a schematic block diagram of an electronic device 900 provided by some embodiments.

As shown in FIG. 9, the electronic device 900 may include: a memory 910 and a processor 920, the memory 910 being configured to store a computer program and transmit program codes to the processor 920. In other words, the processor 920 may call and run the computer program in the memory 910, to implement the method in some embodiments.

For example, the processor 920 may be configured to execute the above method embodiment according to instructions in the computer program.

In some embodiments, the processor 920 may include but is not limited to: a general-purpose processor, a digital signal processor (DSP), an application specific integrated circuit (ASIC), a field programmable gate array (FPGA), or other programmable logic devices, discrete gate or transistor logic devices, discrete hardware components, etc.

In some embodiments, the memory 910 includes but is not limited to: a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not restrictive descriptions, RAMs in many forms, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM), are available.

In some embodiments, the computer program may be divided into one or more modules, and the one or more modules are stored in the memory 910 and executed by the processor 920 to complete the method according to some embodiments. The one or more modules may be a series of computer program instruction segments that can complete particular functions, and the instruction segments are configured to describe an execution process of the computer program in the electronic device.

As shown in FIG. 9, the electronic device 900 may further include: a transceiver 930, where the transceiver 930 may be connected to the processor 920 or the memory 910.

The processor 920 may control the transceiver 930 to communicate with other devices, and in some embodiments, the transceiver may send information or data to the other devices or receive information or data sent by the other devices. The transceiver 930 may include a transmitter and a receiver. The transceiver 930 may further include an antenna, and the number of the antenna may be one or more.

It is to be understood that, various components in the electronic device are connected through a bus system, where in addition to a data bus, the bus system may further include a power bus, a control bus and a status signal bus.

Some embodiments further provide a computer storage medium, storing a computer program or a computer-executable instruction thereon, and the computer program or the computer-executable instruction, when executed by an electronic device, causes the electronic device to perform the method of the above method embodiment.

Some embodiments further provide a computer program product containing a computer program or a computer-executable instruction, and the instruction, when executed by an electronic device, causes the electronic device to perform the method of the above method embodiment.

When software is used for implementation, implementation may be entirely or partially performed in the form of the computer program product. The computer program product includes one or more computer instructions. When the computer program instruction is loaded and executed on the electronic device, all or part of the flows or functions are generated according to some embodiments. The electronic device may be a general-purpose computer, a special-purpose computer, a computer network, or other programmable apparatuses. The computer instructions may be stored in a computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer readable storage medium may be any available medium capable of being accessed by a computer or include one or more data storage devices integrated by an available medium, such as a server and a data center. The available medium may be a magnetic medium (such as a floppy disk, a hard disk, or magnetic tape), an optical medium (such as a digital video disc (DVD)), a semiconductor medium (such as a solid state disk (SSD)) or the like.

A person of ordinary skill in the art may recognize that the exemplary modules and algorithm operations described with reference to the embodiments disclosed in this specification can be implemented by electronic hardware, or a combination of computer software and electronic hardware. Whether these functions are executed in a mode of hardware or software depends on particular applications and design constraint conditions of the technical solutions. A person of skill in the art may use different methods to implement the described functions for each particular application, but it shall not be considered that the implementation goes beyond the scope of the disclosure.

In some embodiments, it is to be understood that the disclosed system, apparatus, and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electric, mechanical, or other forms.

The modules described as separate parts may or may not be physically separate, and the parts displayed as modules may or may not be physical modules, that is, may be located in one position, or may be distributed on a plurality of network units. Some or all of the modules may be selected according to actual needs to achieve the objectives of the solutions of the embodiments. For example, functional modules in some embodiments may be integrated into one processing module, or each of the modules may exist alone physically, or two or more modules may be integrated into one module.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A communication method for automatic driving, performed by a computer device, comprising:

acquiring driving information of a vehicle;

determining a network cell of a path which the vehicle needs to pass according to the driving information;

selecting, from among a plurality of prediction mechanisms, a prediction mechanism adopted for predicting quality of service (QoS) of the network cell, the plurality of prediction mechanisms being different manners in which the QoS of the network cell is predicted; and acquiring a QoS prediction result of the network cell according to the prediction mechanism, wherein the selecting the prediction mechanism comprises:

determining a time remaining until the vehicle arrives at a first position region according to the driving information;

based on the time remaining being greater than a first threshold value, selecting a first prediction mechanism among the plurality of prediction mechanisms as the prediction mechanism, wherein the first prediction mechanism is a manner of predicting the QoS of the network cell by performing statistics of historical data on QoS characteristics of the network cell; and based on the time remaining being less than or equal to a second threshold value, selecting a second prediction mechanism among the plurality of prediction mechanisms as the prediction mechanism, wherein the second prediction mechanism is a manner of predicting the QoS of the network cell by performing the statistics of the historical data on the QoS characteristics of the network cell and prediction of a future trend on the QoS characteristics of the network cell.

2. The communication method according to claim 1, wherein the QoS prediction result of the network cell comprises at least one of a bandwidth, delay, reliability or jitter of the network cell.

3. The communication method according to claim 1, wherein the acquiring the QoS prediction result of the network cell according to the prediction mechanism comprises:

transmitting a QoS analytics subscribing request to a network data analytics function NWDAF according to the prediction mechanism; and acquiring a QoS analytics subscribing notice transmitted by the NWDAF, the QoS analytics subscribing notice comprising the QoS prediction result.

4. The communication method according to claim 1, wherein the driving information comprises at least one of vehicle speed information, driving intention information or driving trajectory information.

5. The communication method according to claim 1, wherein the acquiring driving information of the vehicle comprises:

acquiring inputted first information from a user application as the driving information, the first information comprising at least one of the driving intention information or the driving trajectory information.

6. A communication apparatus applied to automatic driving of a vehicle, comprising:

at least one memory configured to store program code; and at least one processor configured to read the program code and operate as instructed by the program code, the program code comprising:

acquisition code configured to cause the at least one processor to acquire driving information of the vehicle; and processing code configured to cause the at least one processor to determine a network cell of a path which the vehicle needs to pass according to the driving information, wherein:

the processing code is further configured to cause the at least one processor to select, from among a plurality of prediction mechanism, a prediction mechanism adopted for predicting quality of service (QoS) of the network cell, the plurality of prediction mechanisms being different manners in which the QoS of the network cell is predicted;

the acquisition code is further configured to cause the at least one processor to acquire a QoS prediction result of the network cell according to the prediction mechanism; and the processing code is further configured to cause the at least one processor to:

determine a time remaining until the vehicle arrives at a first position region according to the driving information, based on the time remaining being greater than a first threshold value, select a first prediction mechanism among the plurality of prediction mechanisms as the prediction mechanism, wherein the first prediction mechanism is a manner of predicting the QoS of the network cell by performing statistics of historical data on QoS characteristics of the network cell, and based on the time remaining being less than or equal to a second threshold value, selecting a second prediction mechanism among the plurality of prediction mechanisms as the prediction mechanism, wherein the second prediction mechanism is a manner of predicting the QoS of the network cell by performing the statistics of the historical data on the QoS characteristics of the network cell and prediction of a future trend on the QoS characteristics of the network cell.

7. The communication apparatus according to claim 6, wherein the QoS prediction result of the network cell comprises at least one of a bandwidth, delay, reliability or jitter of the network cell.

8. The communication apparatus according to claim 6, wherein the acquisition code is further configured to cause the at least one processor to transmit a QoS analytics subscribing request to a network data analytics function NWDAF according to the prediction mechanism; and acquire a QoS analytics subscribing notice transmitted by the NWDAF, the QoS analytics subscribing notice comprising the QoS prediction result.

9. The communication apparatus according to claim 6, wherein the driving information comprises at least one of vehicle speed information, driving intention information or driving trajectory information.

10. The communication apparatus according to claim 6, wherein the acquisition code is further configured to cause the at least one processor to acquire inputted first information from a user application as the driving information, the first information comprising at least one of the driving intention information or the driving trajectory information.

11. A non-transitory computer-readable storage medium, storing computer code that when executed by at least one processor causes the at least one processor to:

acquire driving information of a vehicle;

determine a network cell of a path which the vehicle needs to pass according to the driving information;

select, from among a plurality of prediction mechanisms, a prediction mechanism adopted for predicting quality of service (QOS) of the network cell, the plurality of prediction mechanisms being different manners in which the QoS of the network cell is predicted; and acquire a QoS prediction result of the network cell according to the prediction mechanism, wherein the select the prediction mechanism adopted for predicting the QoS of the network cell comprises:

determining a time remaining until the vehicle arrives at a first position region according to the driving information;

based on the time remaining being greater than a first threshold value, selecting a first prediction mechanism among the plurality of prediction mechanisms as the prediction mechanism, wherein the first prediction mechanism is a manner of predicting the QoS of the network cell by performing statistics of historical data on QoS characteristics of the network cell; and based on the time remaining being less than or equal to a second threshold value, selecting a second prediction mechanism among the plurality of prediction mechanisms as the prediction mechanism, wherein the second prediction mechanism is a manner of predicting the QoS of the network cell by performing the statistics of the historical data on the QoS characteristics of the network cell and prediction of a future trend on the QoS characteristics of the network cell.

* * * * *